United States Patent [19]

Khvilivitzky

[11] Patent Number: 5,581,250

[45] Date of Patent: Dec. 3, 1996

[54] VISUAL COLLISION AVOIDANCE SYSTEM FOR UNMANNED AERIAL VEHICLES

[76] Inventor: Alexander Khvilivitzky, 9127 NW. 43 Ct., Coral Springs, Fla. 33065

[21] Appl. No.: 393,478

[22] Filed: Feb. 24, 1995

[51] Int. Cl.[6] ..................................... G08G 5/04
[52] U.S. Cl. ........................ 340/961; 340/945; 364/461; 348/113; 348/114; 348/117; 348/135; 348/143; 342/55; 382/104; 382/153
[58] Field of Search ..................... 340/961, 945, 340/435, 903, 946; 364/439, 449, 461, 443, 436, 444; 348/113, 114, 116, 117, 135, 141, 143, 149; 342/29, 55; 382/153, 104

[56] References Cited

U.S. PATENT DOCUMENTS

| | | | |
|---|---|---|---|
| 3,293,641 | 12/1966 | Bennett et al. | 364/461 |
| 3,784,800 | 1/1974 | Willoteaux | 364/461 |
| 4,361,830 | 11/1982 | Honma et al. | 348/141 |
| 4,646,244 | 2/1987 | Bateman et al. | 364/461 |
| 4,862,373 | 8/1989 | Meng | 364/444 |
| 5,375,059 | 12/1994 | Kyrtsos et al. | 364/449 |

*Primary Examiner*—Jeffery Hofsass
*Assistant Examiner*—Benjamin C. Lee

[57] ABSTRACT

A collision avoidance ability for UAV (42) during its non-VFR pre-programmed autonomous flight is achieved by using a forward-looking TV camera (20) which senses visual obstacles in direction of flight. The UAV is equipped with an autopilot which is able of maneuvering and incorporated in a form of flight/mission computer's (10) program. Image processor (18) locks and tracks obstacles in the camera's field of view in real time. It provides the autopilot with information about level of threat and generates appropriate commands. Being warned by the TV camera (20), flight/mission computer (10) initiates appropriate maneuver, in order to avoid possible collision. After that, it returns to interrupted pre-programmed flight. Two forward-looking TV cameras are used to measure a distance between the UAV (42) and the obstacle considering that the level of threat is higher if this distance is less.

3 Claims, 5 Drawing Sheets

VISUAL COLLISION AVOIDANCE SYSTEM FOR UNMANNED AERIAL VEHICLES

BACKGROUND—FIELD OF INVENTION

The invention herein presented relates to Unmanned Aerial Vehicles (UAVs), that is the same as Remote Pilot Vehicles (RPVs), or "drones", which carry a payload (i.e. TV camera) and used, for example, for surveillance and reconnaissance. More particularly, the invention pertains to the Traffic Collision Avoidance Systems and to interoperability between UAVs and other piloted or unmanned aerial vehicles and tall on-ground obstacles.

BACKGROUND—DESCRIPTION OF PRIOR ART

Since the UAV is remote, the operator does not have direct visual contact with the UAV surroundings and is often unable to prevent collision with other aircraft/helicopter or terrain obstacles (such as tall buildings, antenna towers, powerlines, etc.). UAV flight plan is rarely based on vertical or horizontal separation standards, the UAV often flies at lower altitudes, possesses lower speed, expected to frequently change its flight direction, operates in areas with significantly higher density of air vehicles per sq. mi., and often assumes only local operation (for example, in radius not more than 5–7 mi.).

The conventional manner of avoiding the air traffic collisions is by utilizing the Traffic Collision Avoidance Systems (TCAS) and lot transponders. The disadvantages of using these kinds of equipment on-board UAV are as follows: significant weight and power consumption in conjunction with very limited equipment carrying capability of (especially, light) UAV, high cost of such equipment as TCAS and Mode S Transponders, poor match between the standard collision avoidance equipment and the UAV, the standard TCAS equipment is unable to interact with non-cooperating flying or still obstacles and those low altitude objects which are not equipped with the compatible instruments, such typical low flying obstacles, as birds, may be invisible to radar.

A perspective way to avoid collision with various objects which are in a distance of sight from the UAV, is by using the optical or electro-optical instruments. Such devices can utilize scanning beam of light (U.S. Pat. No. 3,434,141) or laser (U.S. Pat. No. 5,321,489). Drawbacks of these systems are in their complexity, intolerance to shocks and vibrations, and high weight and cost.

The airplane collision avoidance system (U.S. Pat. No. 4,918,442) incorporates a set of TV cameras installed in such "remote" points of a piloted aircraft, as tip of wing or rudder. The cameras are installed in the points where the pilot's visibility is bad or limitted. The solution tries to improve this visibility and the pilot's awarness. When a threat has been arised, alarm (based on information provided by one of these cameras) is given to the pilot. The pilot should resolve the problem taking appropriate actions. Important components are lacking in this system and make it inapplicable to the UAV. This system is intended to complement the pilot, rather than to be able to deal with the threat automatically. In a case of UAV, there is no a "forward-looking pilot" on board, and the collision should be avoided, primarily, on course of flight. Besides, the known system does not possess such essential components as a flight computer storing the flight program, maneuvering autopilot, and supporting navigational instruments which allow to carry out the autonomous collision avoidance feature (as it needed for UAV).

It is desirable for the collision avoidance system to be compact, lightweight, and not expensive. It is also desirable that this equipment were able to operate autonomously and independently from the on-ground control station, with shut down transmitters (especially, over enemy's territory). It is further desirable that on-board collision avoidance equipment were able to interact with high-standing terrain obstacles. It is desirable as well that UAV were able to avoid collision with non-cooperating flying objects.

OBJECTS AND ADVANTAGES

Accordingly, several objects and advantages of my invention are a forward-looking TV camera, flight program stored on-board UAV, collision prediction algorithm, autopilot able of maneuvering, and recovery algorithm providing return to the interrupted phase of flight. These components altogether make the UAV fully autonomous, intelligent enough, and allow it to avoid collisions using on-board equipment only. The invented mechanism is used during pre-programmed operation of the UAV and can be used while operating in "passive" mode. When this vehicle is under direct control of the operator, for example during take-off or landing, the autonomous collision avoidance capability can be disabled. The UAV according to this invention, is able to interact with any non-cooperating flying or still object.

A forward-looking TV camera serves for on-course obstacles sensing. While an obstacle appears in the camera's field of view (FOV), this object is automatically locked and tracked. A special algorithm is used to identify targets and determine how to prevent encounter. On-board image processor allows to find a location on the body of the target that is likely to collide with the UAV. Since optical axis of the camera is aligned with UAV's direction of flight, these x and y coordinates are utilized as a basis for autopilot commands generation. The autopilot manages UAV maneuvering to avoid collision. Upon completion of this maneuver, UAV automatically returns to its previous pre-programmed course of flight.

Two forward-looking TV cameras installed on UAV wings, allow not only to detect a threat, but also to measure a distance to the obstacle and, accordingly, a level of this threat. Principles of stereoscopic vision are used to accomplish such measurements.

Obvious advantage of the incorporated concept is in its good compatibility with the UAV. There are light-weight and inexpensive TV cameras. Besides, since the UAV usually carries a TV camera as a payload, they both (payload and forward-looking cameras) operate at the same weather and visibility conditions. The reconnaissance missions are not likely to be initiated at bad visibility. This guarantees that during these missions the collision avoidance capabilities are always provided.

After the collision avoidance equipment according to this invention having been implemented, the UAV possesses the following capabilities:

- to recognize any flying or on-ground on-course obstacles including helicopters, buildings, and birds;
- to conduct an appropriate maneuver allowing to avoid collision;
- to continue the mission when flight is not endangered.

Still further objects and advantages will become apparent from a consideration of the ensuing description and accompanying drawings.

Figure 1:
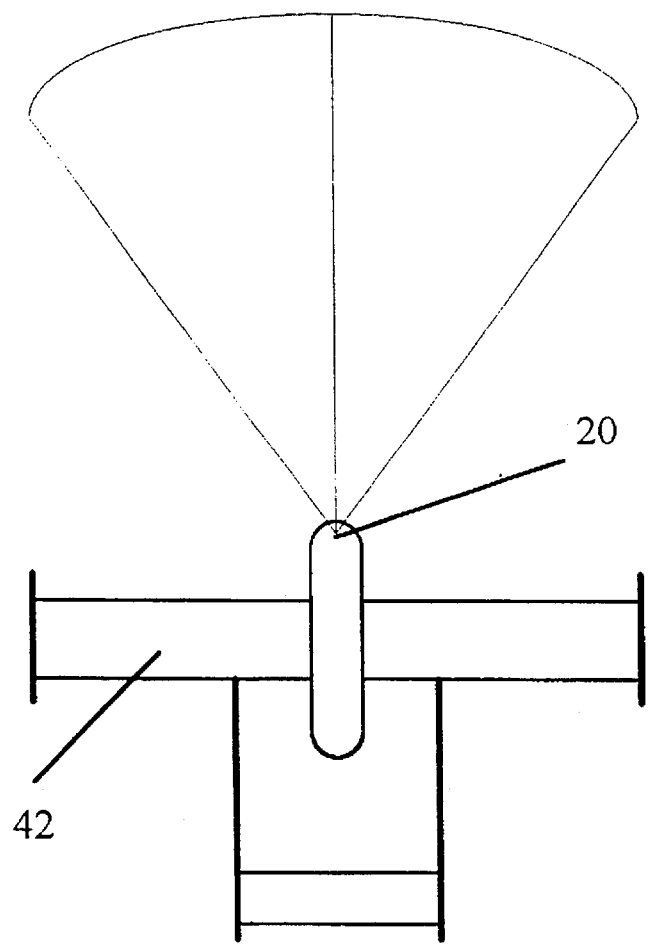
FIG. 1 shows a UAV with a forward-looking TV camera installed in a frontal section of the fuselage in order to provide the visual collision avoidance according to the present invention.

REFERENCE NUMERALS 10 flight/mission computer
12 data acquisition and distribution subsystem
14 sensors
16 GPS receiver
18 image processor
20 forward-looking TV camera
22 up-link receiver
24 down-link transmitter
26 payload TV camera
28 Charge-Coupled Device (CCD) sensor
30 lens
32 board
34 mounting holes
36 shock absorbers
38 radome
40 canopy
42 UAV
44 right side forward-looking TV camera
46 left side forward-looking TV camera

SUMMARY

The Visual Collision Avoidance System for UAVs possesses one or two forward-looking TV cameras, flight/mission computer (which provides the functions of autopilot, flight programmer, air data processor, and collision avoidance), image processor, GPS receiver, sensors, data acquisition and distribution system, up- and down-link communication channels, and payload. A single miniature TV camera is installed inside or outside of the radome or two forward-looking TV cameras are mounted on the wings. This allows to detect visual obstacles on course of UAV flight, maintain appropriate maneuver to avoid possible collision, and, consequently, return to the interrupted operation according to the flight program.

Accordingly, it can be seen that compared with traditional collision avoidance techniques, the present invention is providing autonomous operation of the system, independence from the on-ground ATC stations, ability to fly safely during the operations over enemy territory at the transmitters' shut-down mode, very light weight of the additional on-board equipment, low system cost, good compatibility with the UAV operating conditions, excellent target resolution, capability to avoid collisions with visible flying or on-ground obstacles of various nature, and very good perspectives for the commercial use of this system.

PREFERRED EMBODIMENT—DESCRIPTION

Figure 5:
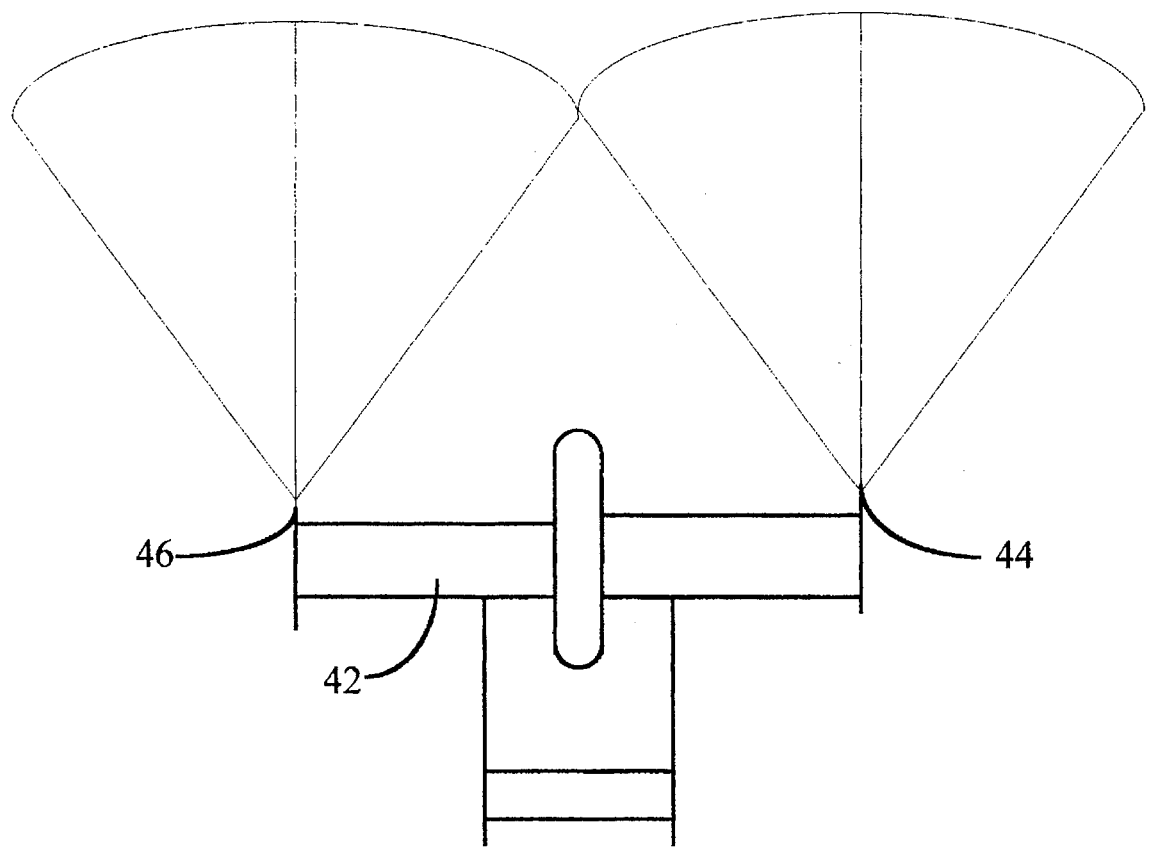
FIG. 5 shows a UAV with two forward-looking TV cameras mounted on its wings which support the visual collision avoidance and distance to obstacle measurement according to the present invention.

Referring to the drawings, FIG. 1 shows UAV with a single forward-looking TV camera mounted in a frontal part of the fuselage, while FIG. 5—with two TV cameras installed on UAV wings.

Figure 2:
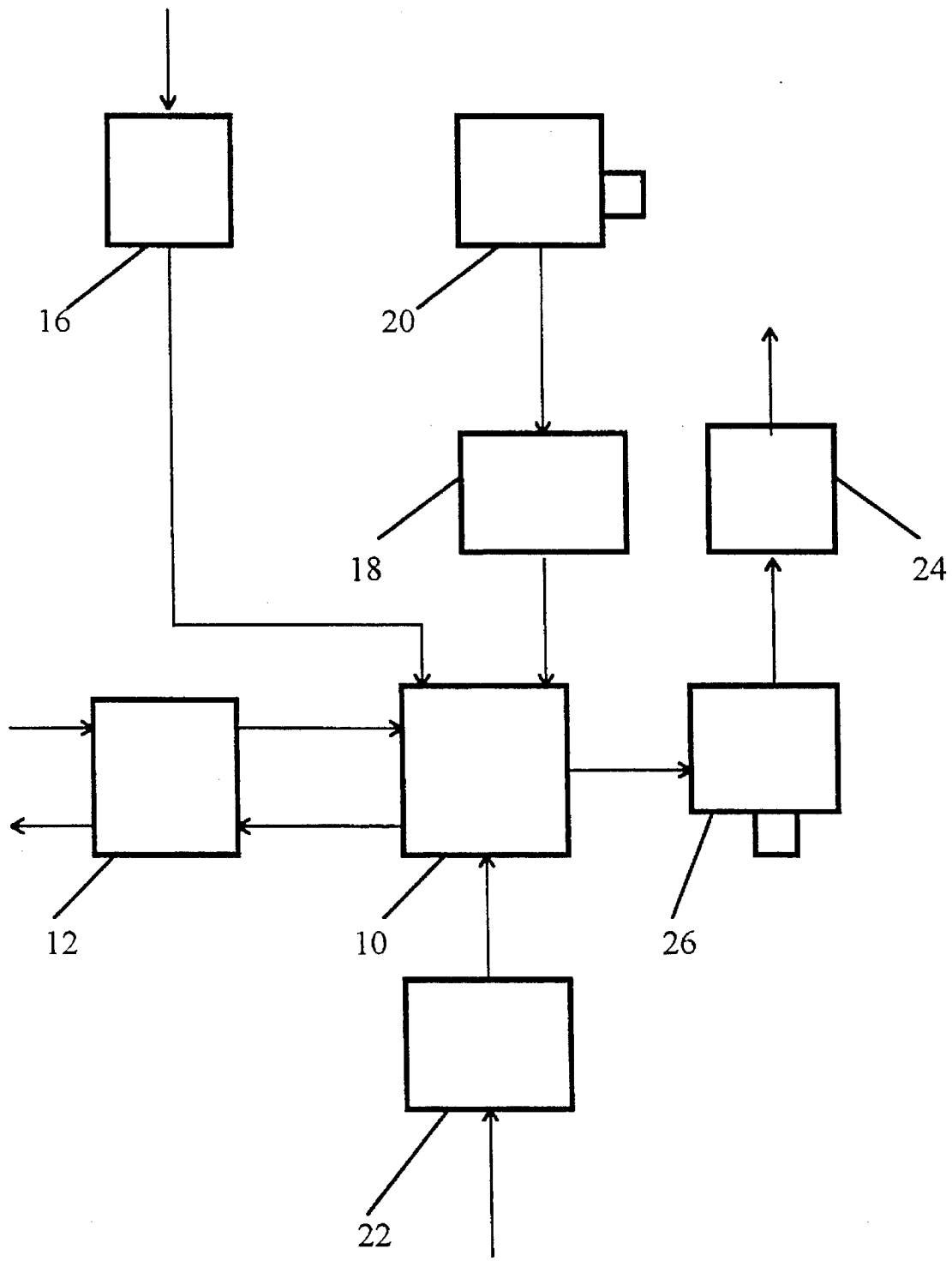
FIG. 2 is a schematic diagram of the visual collision avoidance system according to the present invention.

FIG. 2 shows a block-diagram of the collision avoidance system as a part of the avionics suite of the UAV. The main components of the system are a flight/mission computer 10, data acquisition and distribution subsystem 12, sensors 14, GPS receiver 16, image processor 18, forward-looking TV camera 20, up-link receiver 22, down-link transmitter 24, and payload TV camera 26.

A set of small semiconductor sensors 14 (for example, accelerometers) is used as a basis for the short-term attitude determination. Analog signals from sensors 14 are sampled, multiplexed, and converted to a digital form by the data acquisition part of the subsystem 12. The data distribution part of the subsystem 12 converts digital signals to an analog form and de-multiplexes them. The long-term navigation is supported by the GPS receiver 16.

The flight/mission computer 10 provides an air data processing, flight data management, navigation support, collision avoidance, and autopilot functioning. The flight plan is stored in memory of the computer 10. The computer 10 receives air data and generates commands which are sent to actuators. The forward looking TV camera 20 is a sub-miniature Charge-Coupled Device (CCD) (B&W or color) TV camera with appropriate video circuitry. The image processor 18 processes video data, locks the target, and tracks it in real time.

Figure 3:
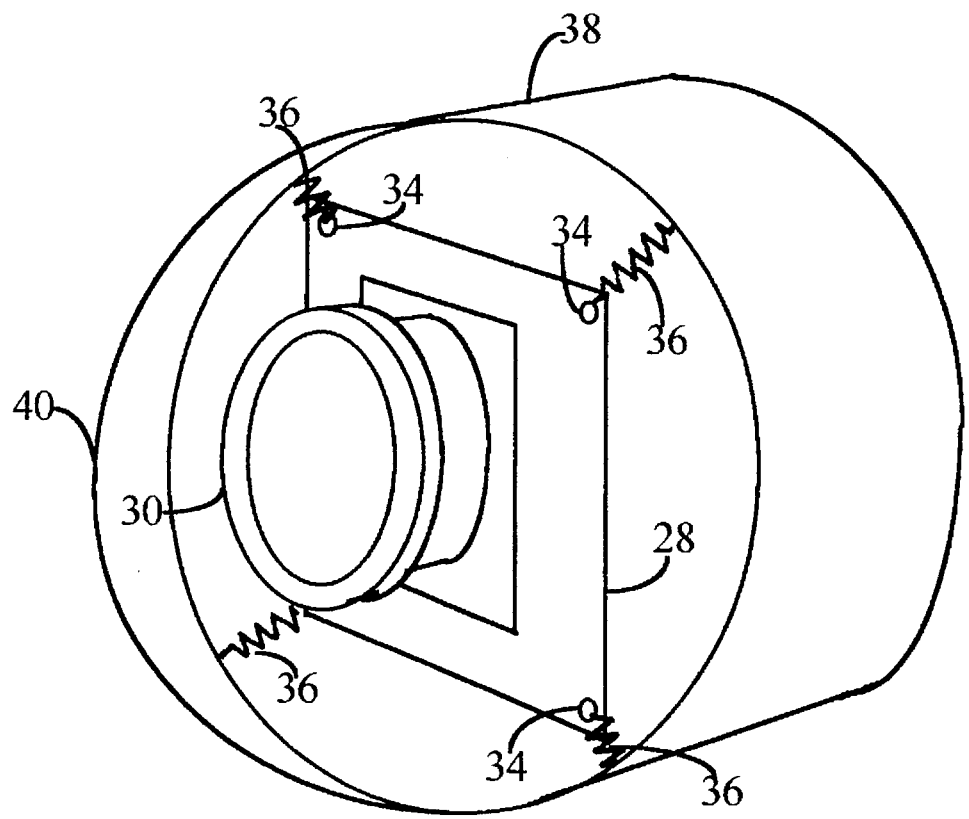
FIG. 3 is an embodiment of the forward-looking TV camera installed in a radome of the UAV.

As it shown on FIG. 3, the forward-looking TV camera 20 is a miniature CCD sensor 28 and a lens 30 usually mounted on a single board 32. The PCB 32 has mounting holes 34 in it corners. A set of shock absorbers 36 is used for attachment of the forward-looking TV camera 20 to a UAV's radome 38. The radome 38 is covered by a transparent canopy 40.

Figure 4:
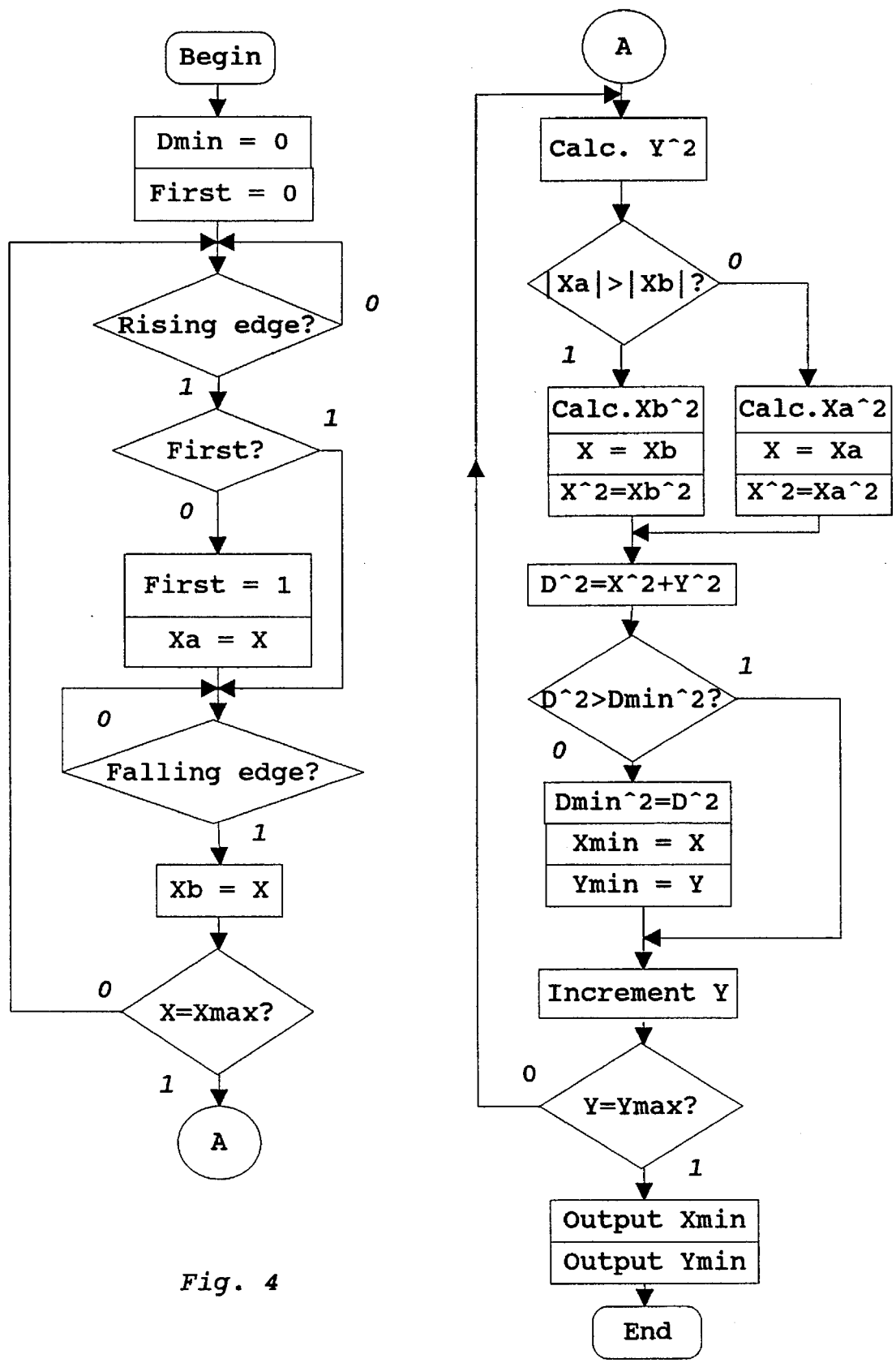
FIG. 4 shows a flow-chart of the image processing algorithm according to the present invention.

FIG. 4 presents an algorithm that is incorporated in the image processor 18, determining which commands the computer 10 should send to UAV's actuators, in order to avoid collision.

PREFERRED EMBODIMENT—OPERATION

Video signal received from the forward-looking TV camera 20 is digitized using an edge contrast principle. The video circuitry also provides CLOCK, HSYNC and VSYNC signals. These signals are used for image processor 18 synchronization and control. A set of counters and decoders is implemented in a form of FPGA, ASIC or DSP.

A target is treated as a solid body which means that all points inside the target's contour are considered belonging to the target. Coordinates of the target's edge are sorted to find the point, the distance from which to the center of the FOV is minimal.

It is determined whether the target (obstacle) is directly on course of flight or not (whether the center of FOV is inside or outside the target). The x and y coordinates of the predicted "point of collision" are used for generating commands to autopilot. Two consequent situations in the process of the collision avoidance are considered. In the first case, center of FOV is inside the target, and the autopilot commands ($\Delta x$, $\Delta y$) are produced with the same signs as the x and y deviations from the center of the field of view to said point. In the second case, the center of FOV is outside the target, and the autopilot commands have inverse signs relative to the deviations. An amplitude of the command is expected to be of maximum value, while the center of FOV is inside the target or in the area adjacent to the center of FOV, and of the inverse-proportional to the radius of the deflection, while not on target and outside the area adjacent to the center. Appropriate coefficients in the autopilot control loop are introduced which are dependent on the level of threat.

OTHER EMBODIMENTS

UAV with two forward-looking TV cameras—Description

As it shown on FIG. 5, when two miniature forward-looking TV cameras 44 an 46 are mounted on the UAV wings at equal distances from its fuselage, a distance between the cameras is used as a stereo basis. The system may contain two or one (more powerful) image processor 18 connected with a flight/mission computer 10. All other components of the system are the same as in the main embodiment of this invention.

UAV with two forward-looking TV cameras—Operation

Both (right and left) TV cameras 44 and 46 bring different images of the obstacle and related to them image processor(s) 18 determine two sets of coordinates of the potential collision point. Knowing a value of the stereo basis of the UAV and using the appropriate mathematical formulas, a distance from the UAV to the obstacle is calculated by the computer 10. This distance is utilized (together with the information whether the obstacle is on course of flight or not) in assessment of a threat level. In the event, the obstacle is closer to the UAV, autopilot's response is stronger.

Conclusions, Ramifications, and Scope

Thus, the reader will see that in this invention I have provided an effective collision avoidance system that can be used on-board of even lightweight UAVs. This system is well fitted to the UAV construction and operation conditions.

Although the description above contains many specificities, these should not be construed as limiting the scope of the invention but as merely providing illustrations of some of the presently preferred embodiments of this invention. Various other embodiments and ramifications are possible within it's scope. For example, the present collision avoidance system can be used in conjunction with the UAV which utilizes an inertial reference system. The forward-looking TV camera 20 can be installed on gyro-based platform (instead of using the shock absorbers 36), which may improve the image quality. External regarding to the radome 38 mounting of the forward-looking TV camera 20 is also possible (this option can be incorporated when the [front-mounted] engine is installed in a front section of the fuselage, instead of the rear-mounted engine). Other types of sensor can be used instead of the TV camera 20, for example an infra-red camera.

Thus the scope of the invention should be determined by the appended claims and their legal equivalents, rather than by the examples given.

What is claimed is:

1. A visual collision avoidance system for Unmanned Aerial Vehicles (UAV) comprising:
   a flight/mission computer means having programs for air data processing, flight data management, navigation support, and autopilot functioning,
   a data acquisition means for filtering, sampling, multiplexing, and converting the data from analog to digital form and data distribution means for converting digital signals to analog form, their de-multiplexing and filtering,
   sensor means for short-term attitude determination,
   a GPS receiver means for long-term navigation, an up-link and down-link means for communications with ground control station.
   an optional payload means for acquisition of surveillance or reconnaissance data,
   wherein a miniature CCD forward-looking TV camera with appropriate video circuitry is installed in the front section of the UAV, output of the camera is connected with an image processor, and the signals produced by this image processor are sent to the said flight/mission computer means, said forward-looking TV camera automatically locks an obstacle on course of the UAV flight and tracks it in real time, a point on the edge of the obstacle closest to the center of camera's field of view is searched, a distance from this point to the center of field of view is determined and used in said flight/mission computer means' program as a basis for autopilot commands generation for collision avoidance maneuver: said autopilot interrupts pre-programmed flight and manages to deflect the UAV in a direction from said center of field of view toward said point on the edge while the center of field of view is inside the obstacle, and in a direction opposite the direction from said center of field of view toward said point while said center of field of view is outside the obstacle; a level of threat and an amplitude of the command which are generated by the autopilot program are of maximum value while the center of field of view is inside the obstacle, and is inverse-proportional to said distance while the center of field of view is not inside the obstacle and outside an area adjacent to the center of the field of view; said flight/mission computer means manage the collision avoidance maneuver, and return to the interrupted pre-programmed flight when the threat is over.

2. A visual collision avoidance system for Unmanned Aerial Vehicles according to claim 1, wherein two said forward-looking IV cameras are mounted on two wings at equal distances from the UAV fuselage, said image processor (or processors) process information from both said forward-looking TV cameras, said flight/mission computer means determine stereoscopic distance to the obstacle and manage the collision avoidance maneuver, considering that a level of threat and command to autopilot are directly proportional to both the distance from the obstacle edge to the center of the field of view and the distance between the UAV and the obstacle.

3. A visual collision avoidance system for Unmanned Aerial Vehicles according to claim 1 or 2, wherein said forward-looking TV camera implemented in a form of a single miniature printed circuit board mounted on a set of shock absorbers which are fastened to the fuselage and to the mounting holes on this board, and the canopy covering the radome where said TV camera is installed, is made transparent.

* * * * *